United States Patent [19]
Schumann et al.

[11] Patent Number: 6,003,218
[45] Date of Patent: Dec. 21, 1999

[54] APPARATUS FOR CUTTING AND ASSEMBLING SLATS FOR WINDOW BLIND UNITS

[75] Inventors: Arthur I. Schumann, Marina Del Rey; Michael J. McCarty, Mission Viejo; Terry N. Ayer, Fontana; Robert Jackson, Anaheim, all of Calif.

[73] Assignee: 3 Day Blinds, Inc., Anaheim, Calif.

[21] Appl. No.: 08/857,380

[22] Filed: May 14, 1997

[51] Int. Cl.⁶ .................................................... B23P 19/04
[52] U.S. Cl. ............................................. 29/24.5; 29/822
[58] Field of Search .................................. 29/24.5, 33 R, 29/433, 434, 700, 822, 823; 160/166.1; 227/19, 21, 29, 99, 103

[56] References Cited

U.S. PATENT DOCUMENTS

| | | | |
|---|---|---|---|
| 4,823,449 | 4/1989 | Chang | 29/24.5 |
| 5,333,365 | 8/1994 | Marocco et al. | 29/24.5 |
| 5,349,730 | 9/1994 | Anderson et al. | 29/24.5 |
| 5,567,208 | 10/1996 | Larggon et al. | 29/24.5 |
| 5,720,087 | 2/1998 | Rasmussen | 29/24.5 |
| 5,799,557 | 9/1998 | Wang | 29/24.5 |
| 5,816,126 | 10/1998 | Pluber | 29/24.5 |
| 5,826,317 | 10/1988 | van Oostrom et al. | 29/24.5 |

*Primary Examiner*—David P. Bryant
*Assistant Examiner*—Marc W. Butler
*Attorney, Agent, or Firm*—Stetina Brunda Garred & Brucker

[57] ABSTRACT

A modular assembly station for slotting and stringedly assembling a plurality of window-blind slats for subsequent construction of a window-blind unit. The assembly station includes at least one and preferably two or more slot cutter assemblies having a cutter member for cutting a slot in a slat through which a pull cord can pass a saw cutting assembly for trimming opposite ends of the slat, and a ladder-string applicator in lateral spaced relationship with the cutter assembly and including an entrance chamber for a slat and a ladder string having an opening thereof presented in alignment with the entrance chamber. A conveyor is located between the slot cutter assembly and the entrance chamber of the applicator for receiving a slat from the slot cutter assembly and laterally advancing it to the entrance chamber. Automatic operation of the assembly station is accomplished conventionally whereby respective operator motors or mechanical actuators associated with each step are in communication with a programmable coordinating controller programmed both for precise location placement with respect to the slats and for continuous operation.

31 Claims, 9 Drawing Sheets

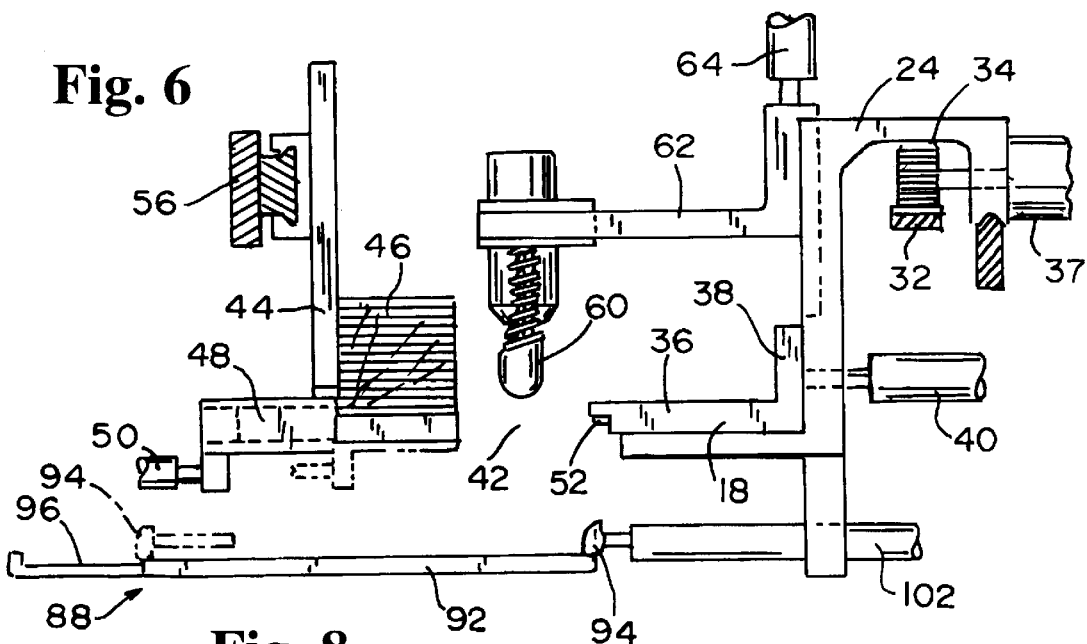
Fig. 6
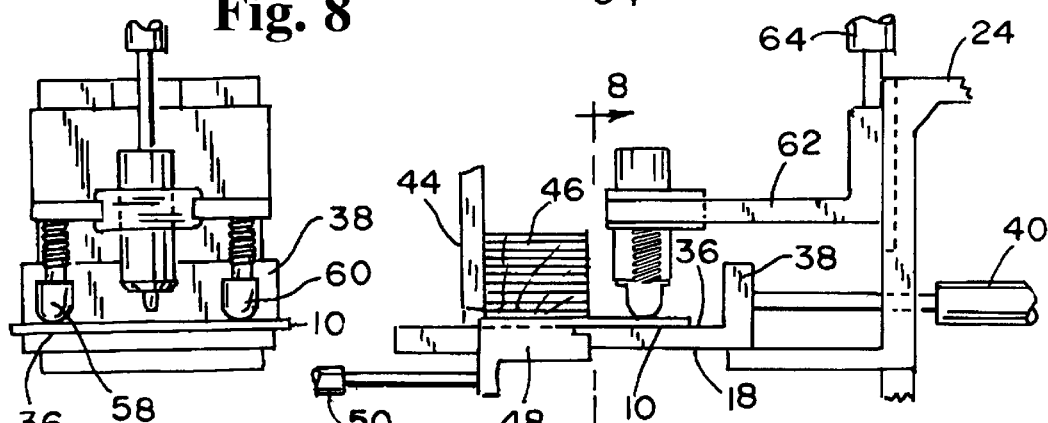
Fig. 8  Fig. 7
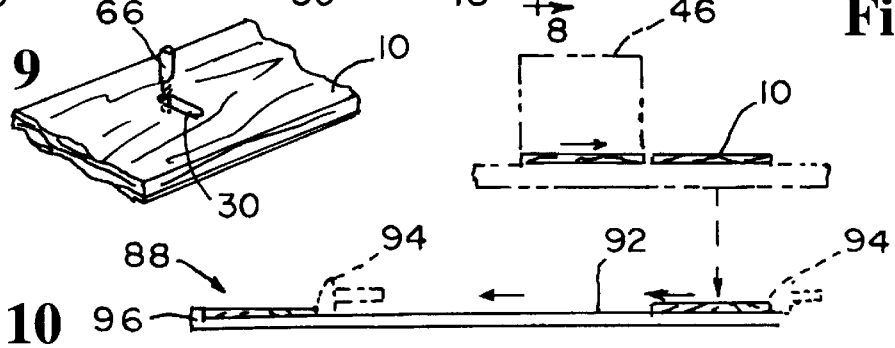
Fig. 9
Fig. 10

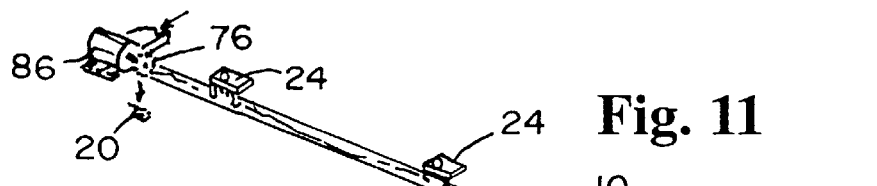
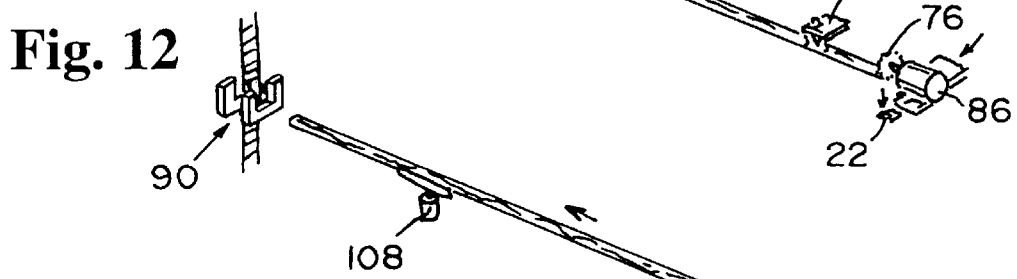
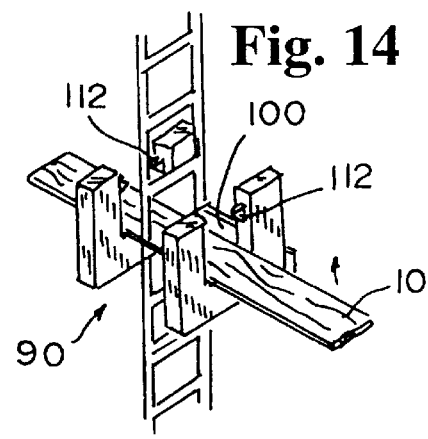
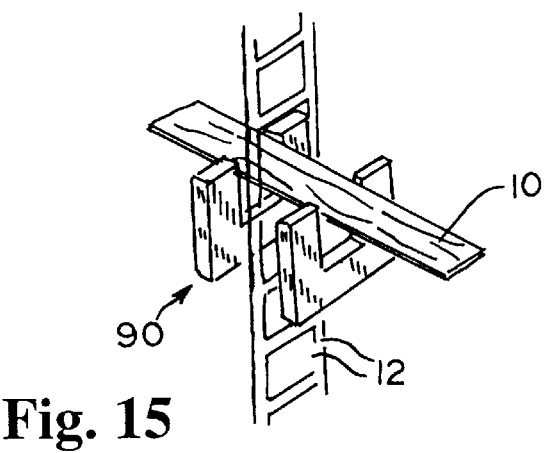
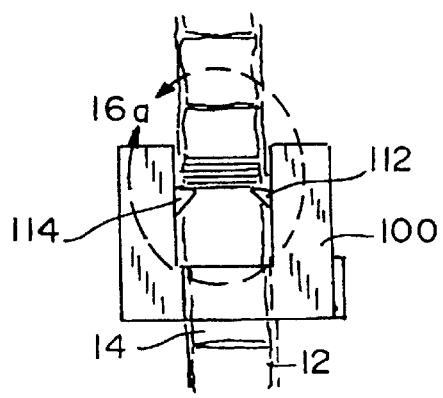

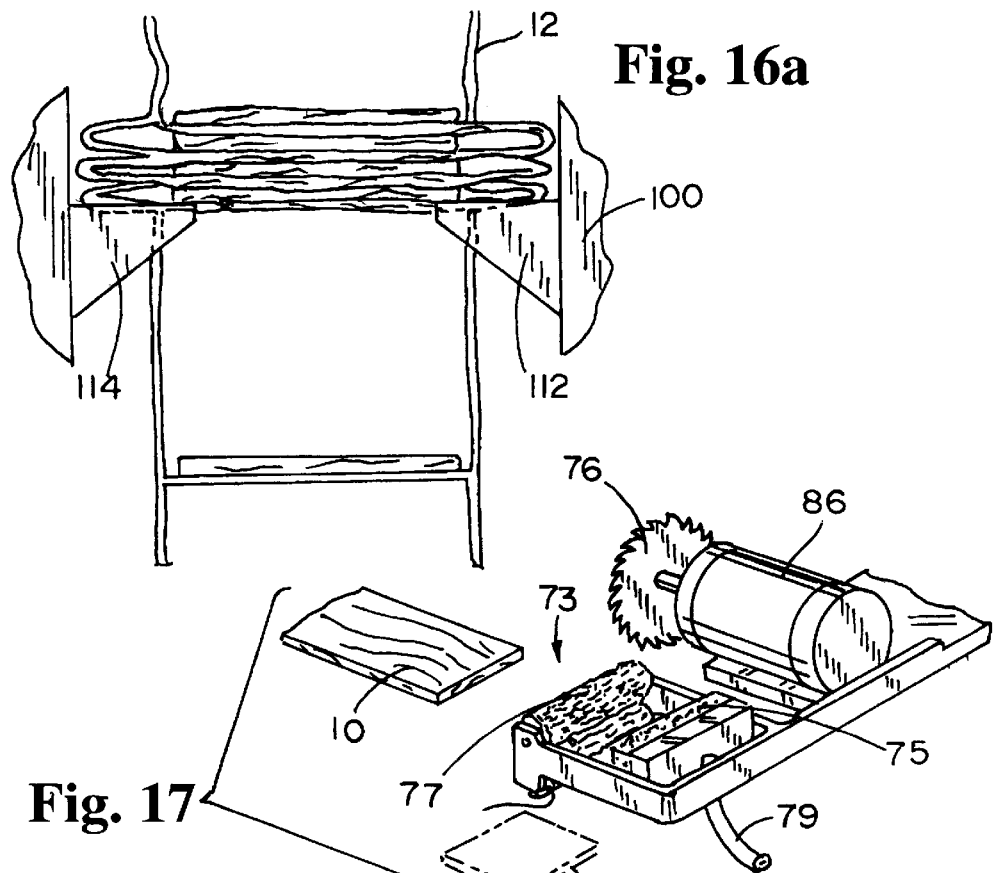
Fig. 16a
Fig. 17
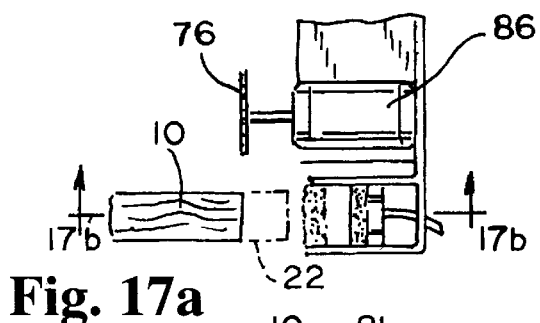
Fig. 17a
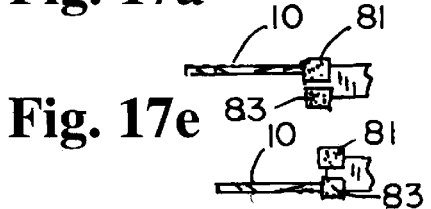
Fig. 17e
Fig. 17f
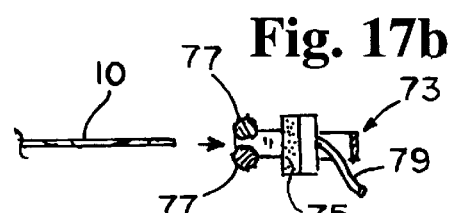
Fig. 17b
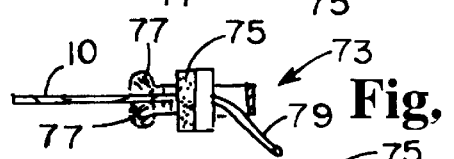
Fig. 17c
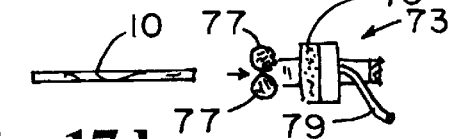
Fig. 17d

APPARATUS FOR CUTTING AND ASSEMBLING SLATS FOR WINDOW BLIND UNITS

FIELD OF THE INVENTION

This invention relates in general to window blinds, and in particular to a modular assembly station for cutting and assembling a plurality of slats for window-blind units.

BACKGROUND OF THE INVENTION

Window blinds constructed of non-metallic slats such as wood, wood composite, vinyl, etc. effectively provide both aesthetic qualities and light-control utility for home or commercial installations. Such window blind construction includes a plurality of slats in generally parallel alignment with each other, with each slat having at least two symmetrically-placed slots, holes or notches also in alignment and through which cords pass for use in raising and lowering the blinds and arranging the angle of the slats. Additionally, at least two symmetrically-placed ladder strings provide support for the slats as the slats are cradled between the rungs of the ladder strings.

As is apparent, assembling a window blind unit involves several activities that range from simply making available a plurality of slats to slotting, arranging and ladder stringing the slats to produce a final product. Because hand construction of window blind units is very labor-intensive and therefore generally not cost effective, it is important to provide automation alternatives that produce a quality end product for an economically reasonable expenditure. Prior-art automation attempts are primarily confined to typical assembly line operations where various stations along a longitudinal path are designated to perform respective tasks in the slat preparation process prior to ladder-stringing the slats. Because of lengthy travel requirements in such assembly line processing, certain slats, and particularly wooden slats, are particularly difficult to transmit because of sag, camber and the like. Also, individual slat alignment at each assembly station along a line prior to performing work on the slat is time consuming and non-productive. Additionally, because of typical assembly line distance, each station along the assembly line must be manned by an operator.

In view of the above considerations, it is apparent that a need is present for a non-longitudinal or non-assembly line apparatus for efficiently assembling a slat window-blind unit. In accord therewith, a primary object of the present invention is to provide a modular assembly station manned by one operator to accomplish such assembly without requiring significant longitudinal travel of individual slats during assembly procedures.

Another object of the present invention is to provide a modular assembly station capable of cutting slots, holes or notches at any selected sites of the slats and thereafter capable of positioning each slat within a ladder space of a ladder string, with all such functions being performed on a single machine.

Yet another object of the present invention is to provide a modular assembly station having the capacity to be programmable for continuous operation.

These and other objects of the present invention will become apparent throughout the description which now follows.

SUMMARY OF THE INVENTION

The present invention is a modular assembly station for slotting, notching or milling holes within, and stringedly assembling, a plurality of window-blind slats for subsequent construction of a window-blind unit. The assembly station comprises at least one and preferably two or more slot cutter assemblies each comprising a cutter member for cutting at least two slots, holes or notches in a slat within which respective pull cords can pass, and a ladder-string applicator in a modular configuration with the cutter assembly and comprising an entrance chamber for a slat and a ladder string having an opening thereof presented in alignment with the entrance chamber. A conveyor is situated between the slot cutter assembly and the entrance chamber of the applicator for receiving a slat from the slot cutter assembly and laterally advancing it to the entrance chamber. As used herein, the term "modular" means a generally non-linear assembly configuration where production steps occur in a relatively quadrilateral space as opposed to conventional longitudinally end-to-end assembly-line space. Thus, slats move transversely rather than longitudinally during production and assembly steps, resulting in efficient use of floor space and convenient monitoring of operations by only a single operator.

Preferably, the assembly station of the present invention includes at least one saw blade assembly, most preferably two, comprising a saw blade for trimming a lateral edge of a slat. Most preferably, the assembly station includes one slot cutter assembly for each slot to be cut in a slat. In a preferred embodiment, the station has in cooperation with the slot cutter assembly a slat retainer magazine for holding a stack of slats, and includes a magazine pusher member situated to advance one slat at a time from the stack to a slat support integral with the slot cutter assembly. Preferably, the magazine pusher member, slat support, slot cutter assembly, saw blade assembly, conveyor and ladder-string applicator each has at least one operator motor in communication with a programmable coordinating controller which is programmed for continuous operation of the assembly station. Because slat movement through the station of the present invention is substantially non-longitudinal, the inefficiencies of slat conveyance within an assembly line production facility are eliminated. Employment of the modular assembly station defined herein therefore facilitates accurate and reliable manufacturing practices.

BRIEF DESCRIPTION OF THE DRAWINGS

An illustrative and presently preferred embodiment of the invention is shown in the accompanying drawings in which:

FIG. 6 is a side elevation view, partially in section, of the slot cutter assembly of FIG. 3;

FIG. 7 is a side elevation view, partially in section, of the slot cutter assembly of FIG. 5;

FIG. 8 is a front elevation view along line 8—8 of FIG. 7;

FIG. 9 is a perspective partial view of a slat with a router cutter cutting therein a slot;

FIG. 10 is a side elevation partial view of a slat support and a conveyor assembly;

FIG. 11 is a perspective partial view of a slat being trimmed by a saw blade assembly;

FIG. 12 is a perspective view of a slat conveyor and a ladder-string placement member;

FIG. 13 is a perspective partial view of a slat approaching the ladder-string placement member;

FIG. 14 is a perspective partial view of a slat within the ladder-string placement member;

FIG. 15 is a perspective partial view of a slat after departure from the ladder-string placement member;

FIG. 16 is a side elevation view of the ladderstring placement member;

FIG. 16a is an enlarged portion of FIG. 16 as identified by phantom line 16a;

FIG. 17 is a perspective view of the saw blade assembly of FIG. 11;

FIG. 17a is a top plan view of the assembly of FIG. 17;

FIG. 17b is a side elevational view along line 17b—17b of FIG. 17a;

FIG. 17c and 17d, preceded by FIG. 17b, illustrate certain sequential movements of the assembly of FIG. 17;

FIG. 17e and 17f illustrate certain sequential movements of a modified assembly of FIG. 17;

DETAILED DESCRIPTION OF THE PREFERRED EMBODIMENT

Overview of Operation

The present invention is directed toward an automated modular assembly station for cutting and assembling a plurality of non-metallic slats for window-blind units. To accomplish production, a stack of slats requiring slots and side trimming are provided to the assembly station. Once the stack is in place and registered, the station is activated and the following sequence of production activity occurs.

The production sequence begins as a first slat is automatically laterally advanced to a site for slot cutting, and slot cutters automatically move to appropriate slat locations and cut two or more slots in the slat. Simultaneously or in close proximity thereto, two respective saw blades automatically move toward each side of the slat and trim each end of the slat in accord with a desired width dimension. Once slot cutting and edge trimming are accomplished, the cutters and saw blades automatically retract to their respective home locations and the cut-and-trimmed first slat is automatically delivered to a conveyor for transport to a ladder-string applicator. Immediately after delivery of the first slat to the conveyor, a second slat is automatically advanced to the site for slot cutting and the process repeats. Meanwhile, the ladder-string applicator automatically presents the desired number of rungs of respective ladder strings upon which the first slat is to be cradled. Thereafter, the first slat is automatically raised upwardly and the second slat, now slotted and trimmed, moves to the ladder-string applicator. This production sequence continues until the required number of slats for a particular window-blind unit have been slotted, trimmed and laddered.

Automatic operation of the assembly station is accomplished conventionally whereby respective operator motors or mechanical actuators associated with each automated step are in communication with a programmable coordinating controller programmed both for precise location placement with respect to the slats and for continuous operation. Such programming can be accomplished automatically by employing conventional bar-code coding for each window-blind unit coupled with a bar code reader that initializes programmed automation at the beginning of construction of each unit. Coding information includes the number of slats required for the window-blind unit, the number and position of slots in each slat for placement of slot cutters, the width dimension of each slat for edge trimming for placement of saw blades, and the like. The actual bar code can be pre-placed for example on a head rail to be ultimately used for the window-blind unit to thereby effectuate continuous re-programming of the assembly station in accord with the specifications of each individual window-blind unit being assembled.

The Preferred Embodiment

Figure 1:
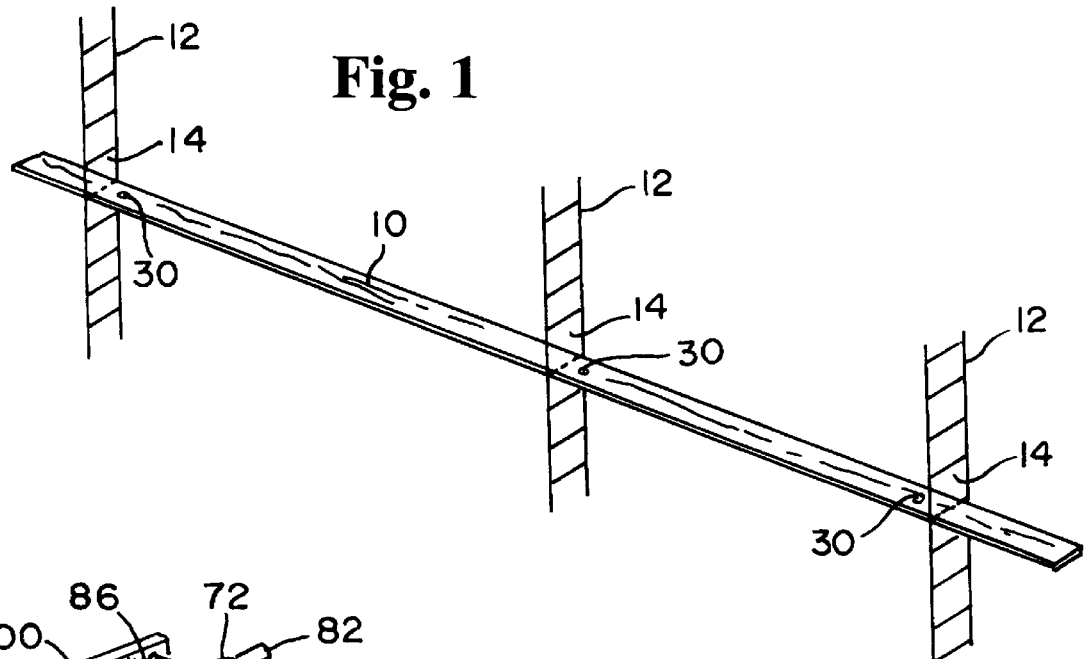
FIG. 1 is a perspective view of a single slat supported by three ladder strings as in a slat window-blind unit.
Figure 2:
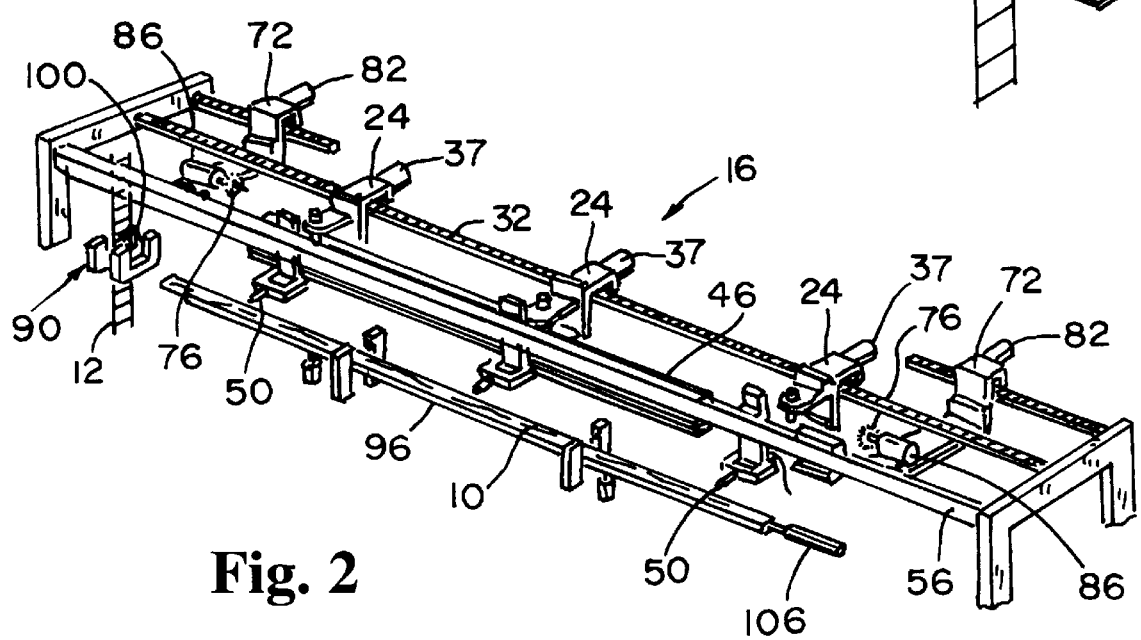
FIG. 2 is a perspective view of a modular assembly station for cutting and assembling a plurality of slats for a window-blind unit.

Referring to FIG. 1, a single wooden slat 10 is shown being supportively cradled by three ladder strings 12. A plurality of slats 10, each situated and supportively cradled in respective ladder-string spaces 14 as is the slat 10 and having top and bottom rails (not shown) above and below the plurality, forms a slat window-blind unit.

With reference to FIGS. 2 to 11, a first embodiment of a modular assembly station 16 for cutting and assembling wooden slats 10 is shown. As depicted, the assembly station 16 has three identical slot cutter assemblies 24 for cutting three respective slots 30 in respective slats 10 on respective identical slat supports 18 integral with the slot cutter assemblies 24. However, those skilled in the art will recognize that more or less slot cutter assemblies 24 may be utilized as desired for the particular window blind being manufactured. The cutter assemblies 24 are mounted on a gear rack 32 and have respective pinions 34 driven by respective electric or air-driven motors 37 to thereby enable individual lateral movement of the assemblies 24 to various transverse sites in accord with the desired positioning of slots 30 to be cut through a slat 10. Because all of the cutter assemblies 24 and all of the integral slat supports 18 respectively are identical to each other, it is to be understood that the following description relating to one cutter assembly 24 and one slat support 18 thereof applies to all three or more cutter assemblies.

Figure 3:
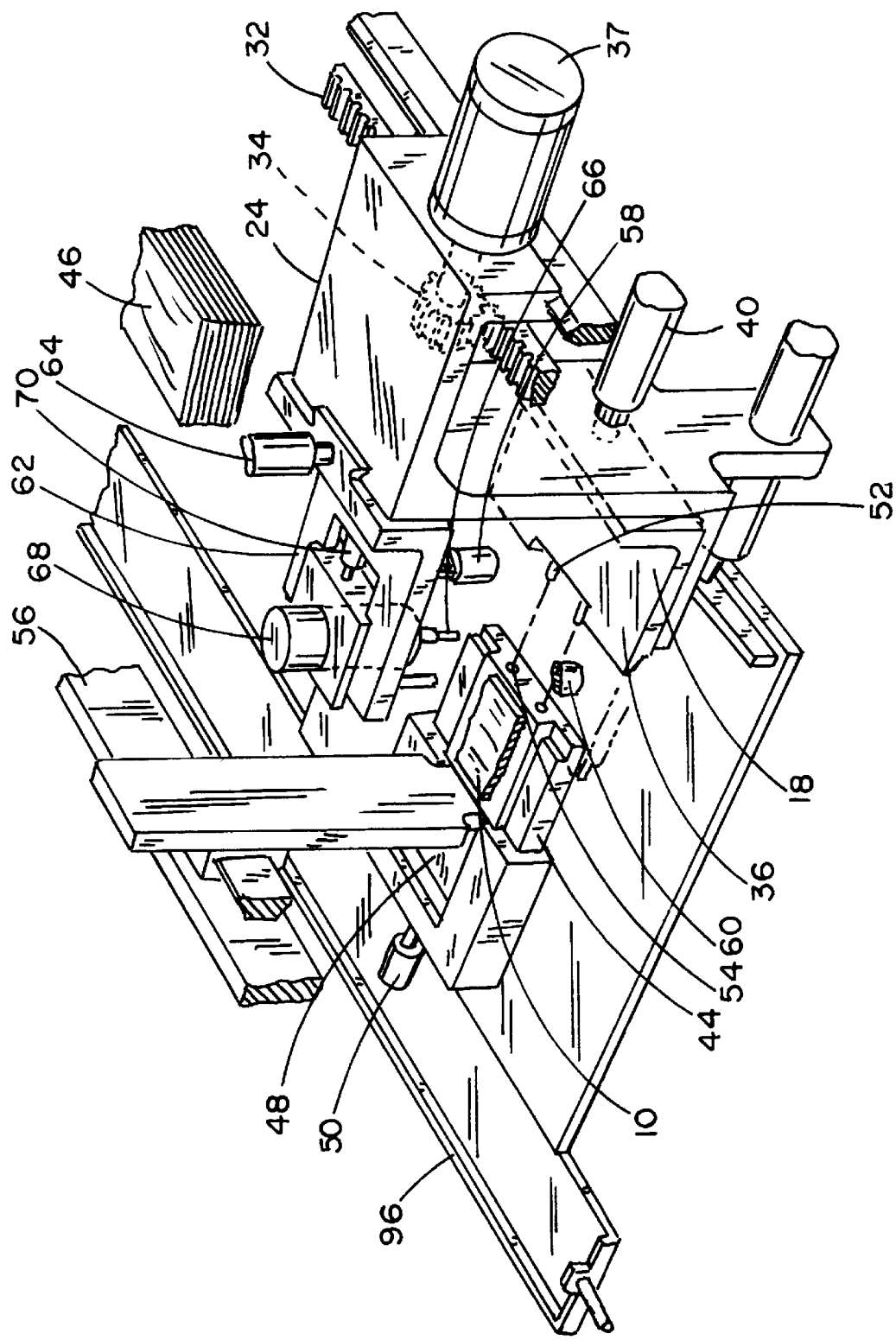
FIG. 3 is an enlarged perspective view, partially in section and partially broken away, of a slot cutter assembly and integral slat support, with the slat support in a retracted position.
Figure 4:
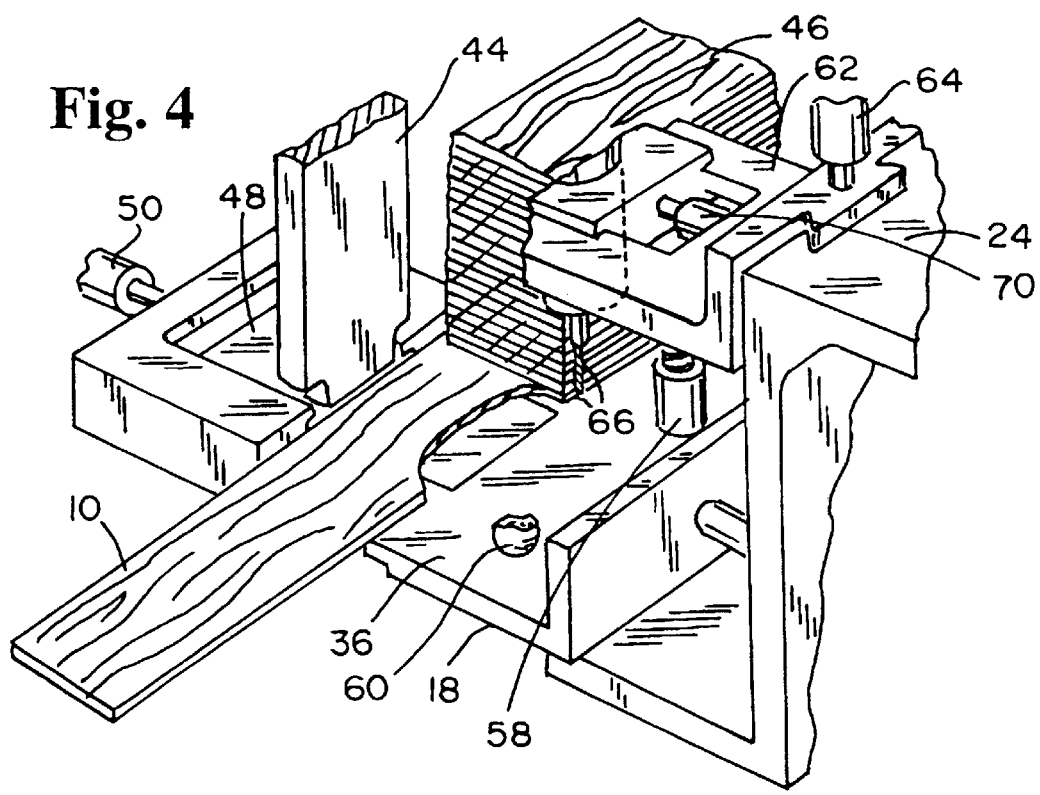
FIG. 4 is a perspective partial view partially broken away of the slot cutter assembly of FIG. 3, with the slat support in a closed position.
Figure 5:
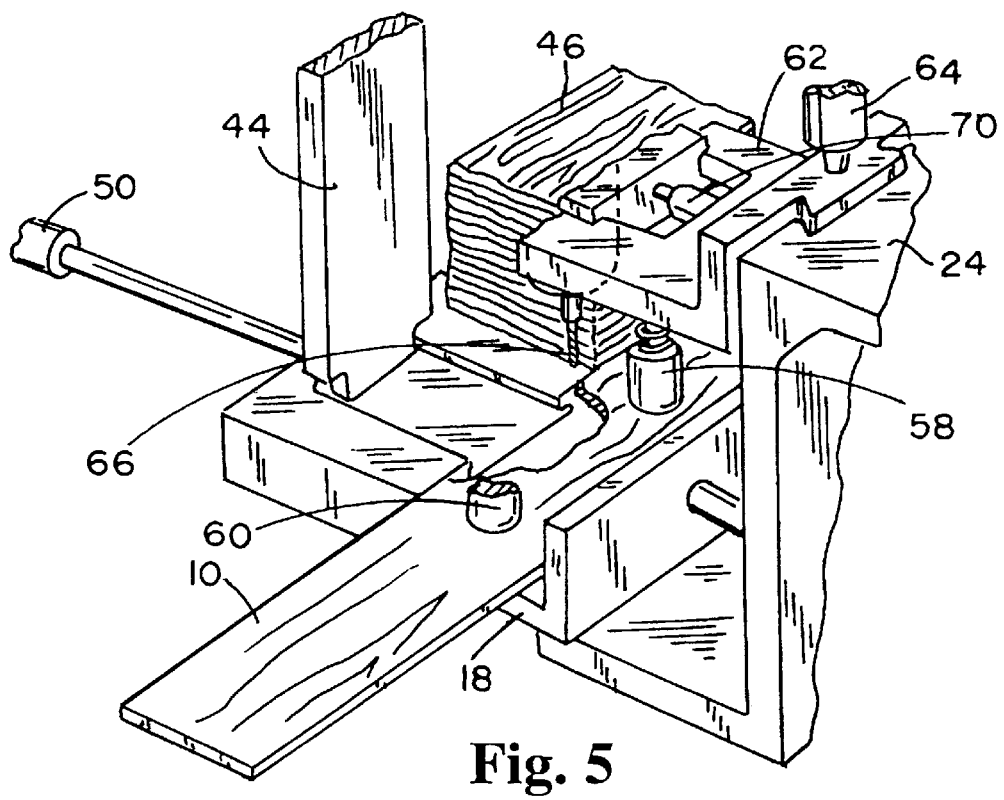
FIG. 5 is a perspective partial view partially broken away of the slot cutter assembly of FIG. 4, with a slat in position for slat cutting therethrough.

FIGS. 3 to 8 show the slat support 18 of the associated cutter assembly 24. The slat support 18 has a floor 36 with a back wall 38, and is operable by an electric motor 40 to be in a retracted configuration as shown in FIGS. 3 and 6 to create an open space 42, or to be in an extended configuration as shown in FIGS. 4, 5 and 7 to thereby close the open space 42. Opposing each slat support 18 and slidingly engaged with a mounting bar 56 is a slat retainer magazine 44 for holding a stack 46 of slats 10. The magazine 44 has a magazine pusher member 48 operable by an electric motor 50 to advance the lowermost slat of the stack 46 of slats onto the floor 36 of the slat support 18 when the slat support 18 is in an extended configuration and the open space 42 is closed. Specific reference is made to FIGS. 3 to 5 which show the progression of slat movement from the magazine 44 to the slat support 18. Specifically, in FIG. 3, a slat 10 (broken away) representing the lowermost slat of a stack 46 is held by the magazine 44 while the slat support 18 is in a retracted configuration to create open space 42. As shown in FIGS. 3 and 6, positioning pins 52 extending from the floor 36 enter mating holes 54 of the magazine 44 when the slat support 18 is in its extended configuration. Progressing to FIG. 4, the slat support 18 is in an extended configuration ready to accept the lowermost slat of the stack 46. Finally, in FIGS. 5 and 8, the slat 10 has been advanced by the pusher member 48 of the magazine 44 onto the floor 36 of the slat support 18.

Cooperatively situated above the slat support 18 of the cutter assembly 24 are two spring-tension clamps 58, 60 extending from a bracket 62 operable by an electric motor 64 to move and force the clamps 58, 60 downwardly against a slat 10 on the floor 36 of the slat support 18 as illustrated in FIGS. 7 and 8 to thereby securely retain the slat 10 for slot cutting. Once the slat 10 is so retained, a slot 30 is cut therethrough by a cutting instrument such as a router 66 also extending from the bracket 62. Rotation movement of the router 66 is governed by an electric motor 68; transverse movement is governed by an electric motor 70. As shown in FIG. 9, the blade-tip of the router 66 produces a slot 10 through which a pull-cord (not shown) can pass. Alternatively, circular holes, notches, etc. can be produced in a slat by the router 66 as required by particular pull-cord and ladder-string characteristics.

The modular assembly station 16 also includes two saw blade assemblies 72 each comprising a rotary saw blade 76 for trimming lateral edges 20, 22 of a slat 10 while the slat 10 is securely retained by the clamps 58, 60 as illustrated in FIG. 11. The saw blade assemblies 72 are mounted on respective gear racks 78, 80 and are moveable transversely by pinion action as described above in relation to the cutter assemblies 24. Respective electric motors 82 move the saw blade assemblies 72 transversely, while rotation of each blade 76 thereof is controlled by a blade electric motor 86. Optionally, each saw blade assembly 72 can include a paint applicator/paint dauber device 73 as shown in FIGS. 17 and 17a–17f. The device 73 as shown in FIGS. 17 and 17a–17d includes a paint applicator pad 75 for applying paint or the like to the edge of a slat 10 after it is trimmed by the blade 76. Paint is supplied by a conventional pump (not shown) from a paint source (not shown) through a conveyor tube 79 to the applicator pad 75. Two opposing paint dauber rollers 77 are disposed inboard of the paint applicator pad 75. In operation, after trimming a slat 10, the assembly 72 moves laterally inwardly (FIG. 17b) such that the newly-cut edge of the slat contacts the pad 75 (FIG. 17c) and paint deposition occurs. Thereafter, the assembly 72 moves laterally outwardly (FIG. 17d), and excess paint on the edge of the slat 10 is absorbed by the dauber rollers 77, preferably made of an absorbent foam rubber, as the rollers 77 move along the slat edge. The assembly 72 then retreats to its home position. Alternatively, as shown in FIGS. 17e and 17f, an inboard-mounted paint applicator pad 81 can contact the newly-cut edge, and can be followed by an inboard-mounted dauber pad 83 to absorb excess paint.

Disposed beneath the slat support 18 is a conveyor 88 for accepting a slotted slat 10 and laterally transporting that slat to a ladder-string applicator 90. As shown in FIGS. 2, 6, 10 and 12, the conveyor 88 comprises a receiver platform 92 disposed to accept a slotted slat 10 dropped through the open space 42 (illustrated in FIG. 10) as the slat support 18 is retracted after slots 30 are cut through the slat 10. The receiver platform 92 has associated therewith a platform pusher member 94 that advances the slotted slat 10 to an elongate channel 96 in alignment with an entrance chamber 98 of a U-shaped ladder-string space presenter housing 100 of the ladder-string applicator 90. The platform pusher member 94 is operated by an electric motor 102. Thereafter, the slat 10 within the channel 96 is longitudinally advanced by a channel pusher member 104 operated by an electric motor 106 to and within the entrance chamber 98. Concurrently, one or more ladder-string spaces 14 of respectively one or more ladder strings 12 are presented in the entrance chamber 98 as described below and the slat 10 is positioned within the spaces 14. Specifically, as shown in FIGS. 13 to 16a, the slat 10 is advanced (FIG. 13) to the entrance chamber 98 of the housing 100 while at least one ladder string 12 is positioned therein. Once within the ladder-string space 14 of the string 12 (FIG. 14), the slat 10 is raised (FIGS. 15, 16 and 16a) by raising the elongate channel 96 through operation of electric motors 108, 110 (FIG. 12) until the slat 10 passes through opposing spring clip ledges 112, 114 disposed at the top of the housing 100. Once passed, the slat 10 rests on the top of the ledges 112, 114 and gravity opens a succeeding ladder-string space 14 situated in the entrance chamber 98 of the housing 100. The channel 96 is thereafter lowered to its original position to await entry of the next slat to be likewise moved.

Figure 18:
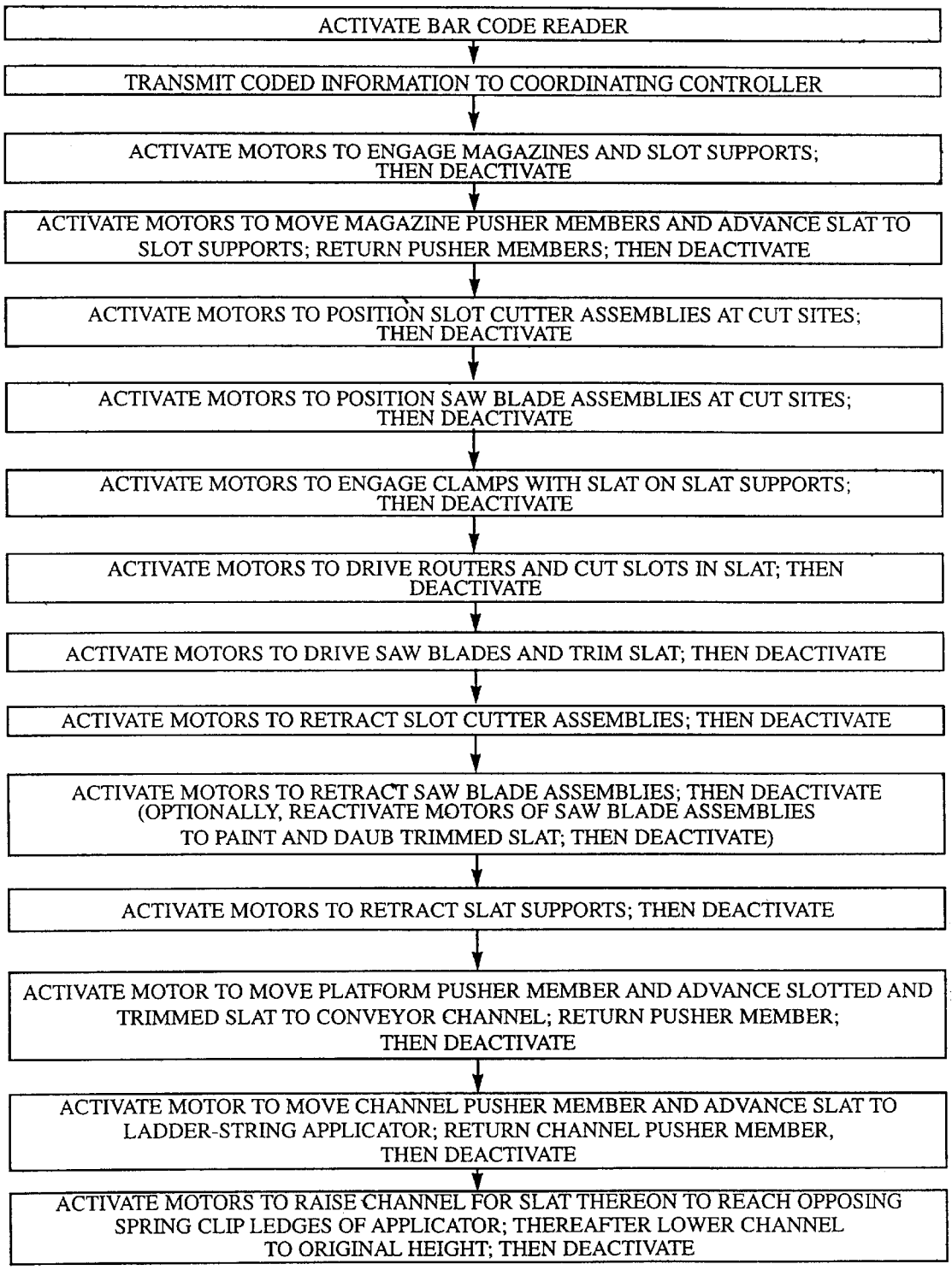
FIG. 18 is a flow chart illustrating continuous automated information.
Figure 19:
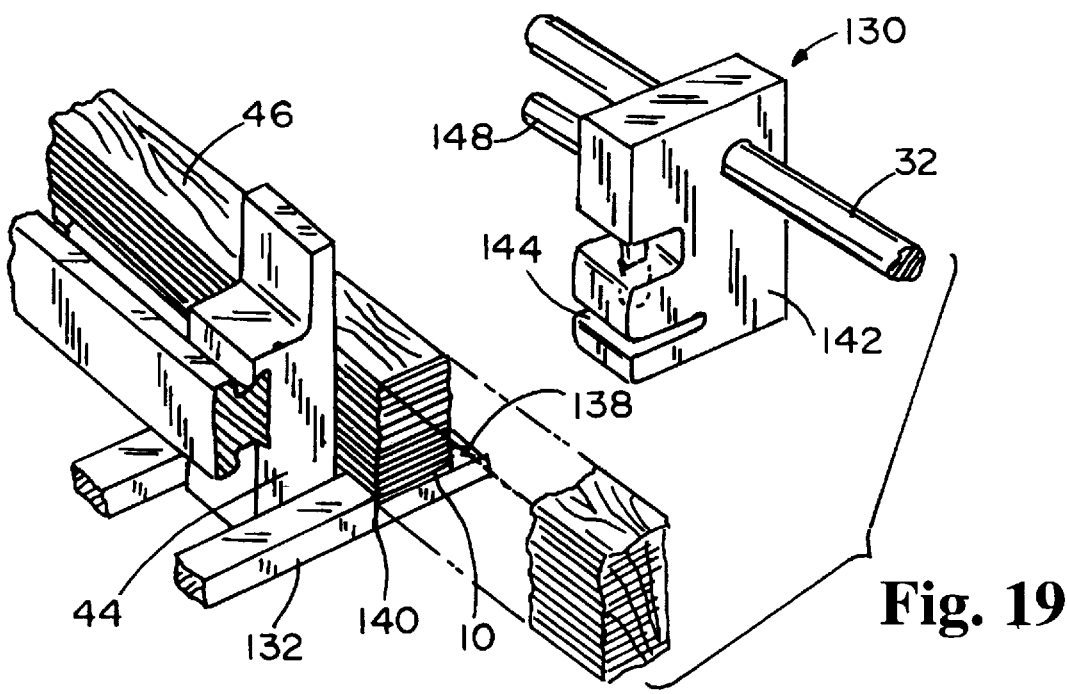
FIG. 19 is a perspective view of a second embodiment of a slot cutter assembly.

All of the various motors identified above are in communication with a conventional programmable coordinating controller as would be recognized in the art and which is programmed for continuous sequential operation of the assembly station 16. FIG. 18 illustrates this controlled operability, as described below.

Operability of the modular assembly station 16 commences by placing a stack 46 of slats 10 on the slat retainer magazine 44, with the respective magazines 44 and slot supports 18 engaged by pins 52 in mating holes 54. The number of slats 10 corresponds to the number required to construct the particular window-blind unit. Specifications for the window-blind unit preferably are pre-programmed as known in the art into the modular assembly station by first assigning a bar code to the unit that includes width, slot placement, etc. for each slat 10 and then transferring, as illustrated in FIG. 18, this information to the programmable coordinating controller of the assembly station 16. In accord with FIG. 18, such programming moves the cutter assemblies 24 and engaged magazines 44 to the proper positioning. Production begins by activation of each pusher member 48 to advance the lowermost slat 10 of the stack 46 to the slat supports 18. Thereafter, each cutter assembly 24 is activated to cause the clamps 58, 60 thereof to securely retain the slat 10, and each router 66 is activated to cut slots 30 in the slat 10. Simultaneously, the saw blade assemblies 72 are moved and activated and the lateral edges 20, 22 of the slat 10 are trimmed off by the saw blades 76 to produce a properly dimensioned slat 10. After slot production and edge trimming, the cutter assemblies 24 and saw blade assemblies 72 are withdrawn to their respective home positions and the slat supports 18 are retracted to permit the slotted and trimmed slat 10 to fall to the receiver platform 92 of the conveyor assembly 88. Thereafter, two events occur substantially simultaneously: (1) the slotted and trimmed slat 10 is moved to the channel 96 and advanced to the ladder-string applicator 90 where it is placed within at least one ladder-string space 14 and raised to rest on the spring clip ledges 112, 114; and (2) each slat support 18 extends and a succeeding lowermost slat is advanced from the stack 46 to the slat supports 18 for production to start over. These events continue until the required number of slats 10 are slotted and trimmed for subsequent final construction of the window-blind unit.

Figure 20:
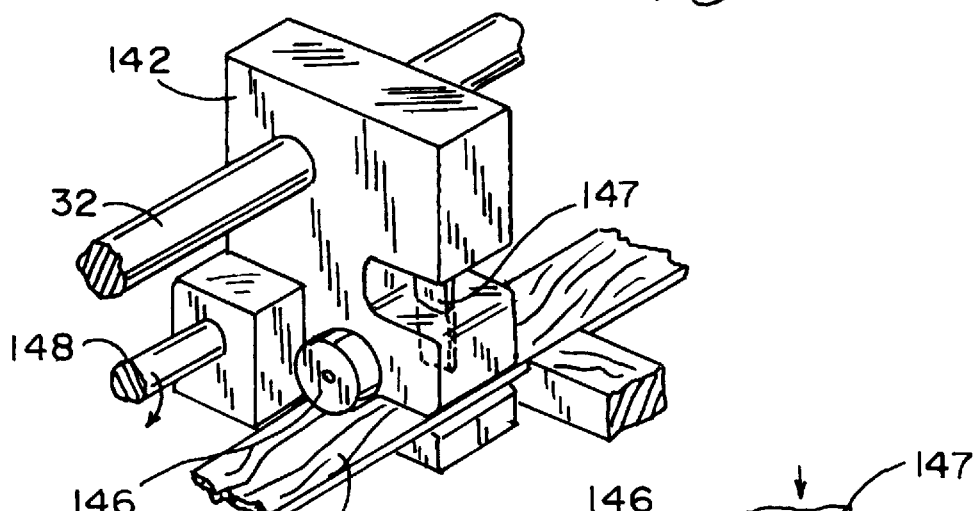
FIG. 20 is a perspective view of a slot cutting fixture of the assembly of FIG. 19.
Figure 21:
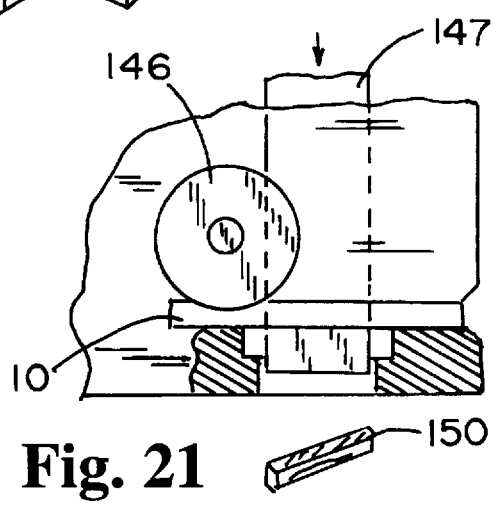
FIG. 21 is an enlarged side elevation view of a slot cutting punch.
Figure 22:
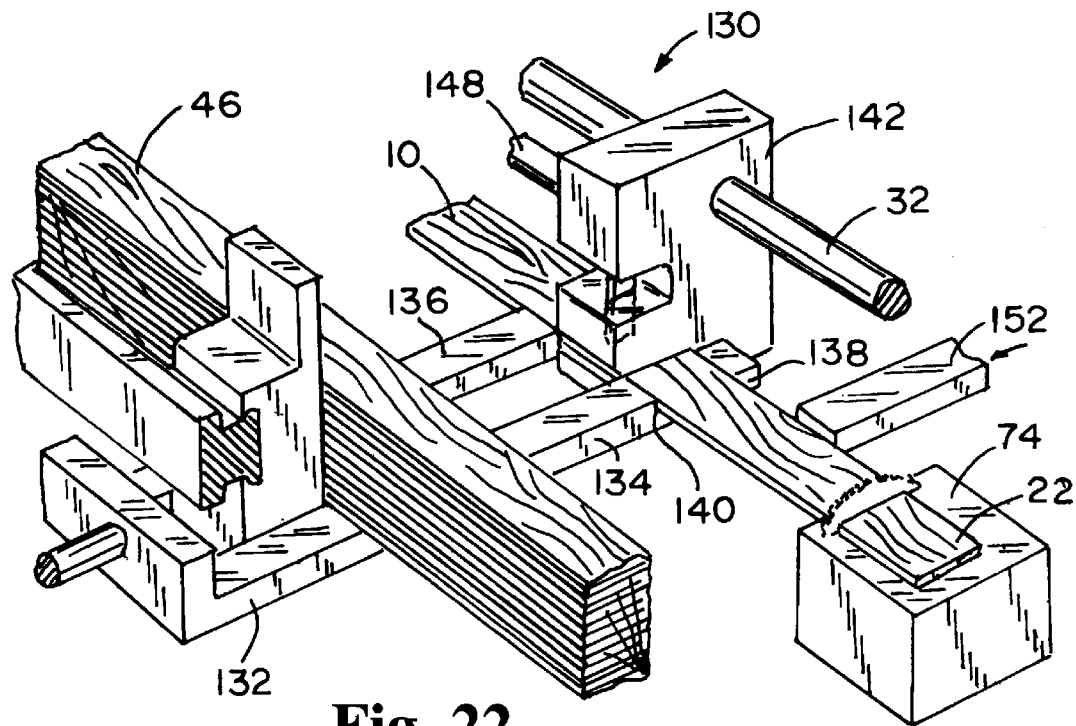
FIG. 22 is a perspective view of the assembly of FIG. 19 with slat finishing apparatus.
Figure 23:
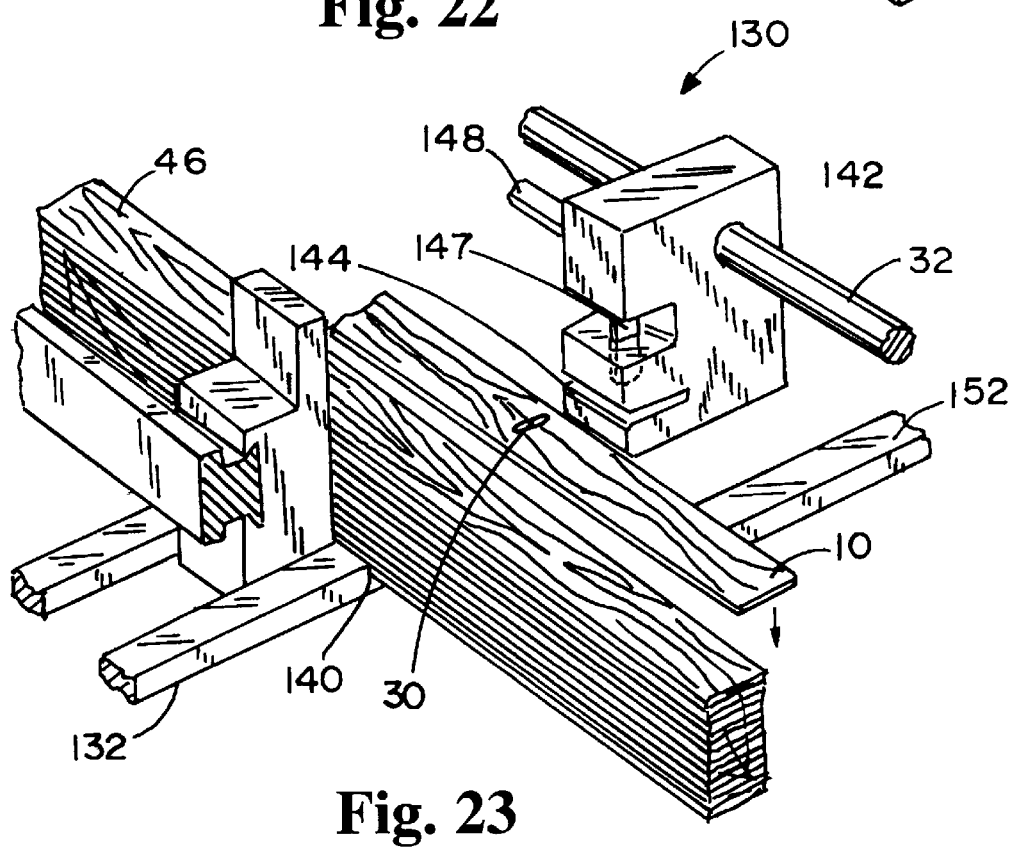
FIG. 23 is a perspective view of a finished slat being deposited to a conveyor for delivery to a ladder-string applicator.

Referring now to FIGS. 19–23, a second preferred slot cutter assembly 130 is shown and comprises a second preferred embodiment replacing cutter assemblies 24 and slat supports 18 of the first embodiment as shown in FIGS. 2–11. As in the first embodiment, only three identical assemblies 130 for cutting their respective slots 30 in respective slats 10, and the description herein of one assembly is meant to refer to all assemblies 130. In this second embodiment, operation of the assemblies 130 is accomplished totally through respective mechanical actuators or linkages to thereby assure timed interaction of all elements. As opposed to the first embodiment's respective extendable slat supports 18, tension clamps 58, 60 for holding a slat during slotting procedures, router cutters 66, each assembly 130 of the second embodiment includes a carrier 132 comprising two movable parallel support surfaces 134, 136 each having a step-down surface 138 forming a notch 140 capable of engaging and moving one lower-most slat 10 from the stack 46 of slats 10 positioned on the slat retainer magazine 44. The support surfaces 134, 136 deliver a slat 10 to a slot cutting fixture 142 which is mounted on a guide bar 145 and is therefore laterally movable in aligned movement with the carrier 132 and positionable as required for particular slat length and desired slot placement. The fixture 142 includes a receiving slot 144 into which a slat 10 is delivered as shown in FIGS. 20–22, with the slat 10 releasably held in place by a roller 146. A conventional punch blade 147 is disposed in the fixture 142 for downward movement through a slat 10 in place, with such downward movement a result of rotational movement of a cam rod 148 by a standard mechanical linkage (not shown) connected to the rod 148. Punch operation results in formation of a slot 30 in the slat 10, with the removed portion 150 as shown in FIG. 21 falling to the ground. Simultaneous with or subsequent to punch operation, a saw blade assembly 74 disposed at each side of the slat 10 advances to trim off the respective edges 22 of the slat 10 as shown in FIG. 22 and earlier described in relation to the first embodiment. Optionally, a paint applicator pad and paint dauber pad as also earlier described in relation to the first embodiment can be included. After cutting, the saw blade assembly 74 is retracted.

Upon completion of trimming and punching a slat 10, the support surfaces 134, 136 of the slot cutter assembly 130 withdraw to engage another lower-most slat from the stack 46 while the already processed slat 10 is retained with the fixture 142 through pressure from the roller 146. To remove the prepared slat 10 from the fixture 142, a pusher rod 152 or similar alternative actuator is provided to disengage the slat 10 and cause its travel vertically to the conveyor 88 (as shown in FIG. 8) for travel to the ladder-string applicator 90 (as shown in FIGS. 11-15) as earlier described.

In operation, the slot cutter assembly 130 exemplified in this second embodiment is somewhat more simplified in operation since activation of the entire assembly is mechanical and therefore dependent upon a single circuit operation as opposed to the coordination of a plurality of components operating on independent commands. As a result, timing of the steps of the manufacturing event are fully coordinated with each other and timing programming among separate operating systems is eliminated. In particular, operability of the modular assembly station incorporating the slot cutter assembly 130 of the second embodiment commences by placing a stack 46 of slats 10 on the slat retainer magazine 44. The number of slats 10 in the stack 46 corresponds to the number required to construct the particular window-blind unit. Specifications for the window-blind unit preferably are pre-programmed as known in the art into the modular assembly station by first assigning a bar code to the unit that includes width, slot placement, etc. for each slat 10 and then transferring this information to the programmable coordinating controller of the assembly station 16 so that the cutter assemblies 130 move to the proper positioning for slat cutting.

Production begins by activation of each of the three carriers 132 such that the parallel support surfaces 134, 136 thereof engage with the notch 140 the lowermost slat 10 of the stack 46 and advance that slat to the receiving slot 144 of the slot cutting fixture 142. The slat 10 is frictionally retained in the slot 144 by the roller 146, and cam rod 148 is rotated as shown by the arrow in FIG. 20 to cause the respective punch blades 147 of each of the three fixtures 142 to cut slots 30 in the slat 10. Simultaneously, the saw blade assemblies 72 are moved and activated and the lateral edges 20, 22 of the slat 10 are trimmed off by the saw blades 76 to produce a properly dimensioned slat 10. Optionally, each saw blade assembly 72 can include a paint applicator/paint dauber device 73 as earlier described with respect to FIGS. 17 and 17a–17d. After slot production and edge trimming, the three carriers 132 with support surfaces 134, 136 and saw blade assemblies 72 are retracted to their respective original sites. Thereafter, the pusher rods 152 move as shown by the arrow in FIG. 22 to disengage the slat 10 from the slot 144 of the fixture 142 to thereby cause the slotted and trimmed slat 10 to fall to the receiver platform 92 of the conveyor assembly 88. Two events then occur substantially simultaneously: (1) the slotted and trimmed slat 10 is moved to the channel 96 and advanced to the ladder-string applicator 90 where it is placed within at least one ladder-string space 14 and raised to rest on the spring clip ledges 112, 114; and (2) each of the three carriers 132 are activated such that the parallel support surfaces 134, 136 thereof engage with the notch 140 a subsequent lowermost slat 10 of the stack 46 and advance that slat to the receiving slot 144 of the slot cutting fixture 142 for production to thereby start over. These events continue until the required number of slats 10 are slotted and trimmed for subsequent final construction of the window-blind unit. As earlier noted, a significant operational difference between the first and second embodiments is the fact that the cutter assemblies 130, which are defined to include the carriers 132, slot cutting fixtures 142 with punch blades 147, and pusher rods 152 operate through a mechanical drive mechanism which assures interactive timing of events without requiring coordination of pneumatic or other separate activation elements for individual components.

While illustrative and presently preferred embodiments of the invention has been described in detail herein, it is to be understood that the inventive concepts may be otherwise variously embodied and employed and that the appended claims are intended to be construed to include such variations except insofar as limited by the prior art.

What is claimed is:

1. An assembly station for slotting and stringedly assembling a plurality of elongate window-blind slats for subsequent construction of a window-blind unit, the station comprising:

at least one slot cutter assembly comprising a cutter member for cutting at least one slot in a slat through which a pull cord can pass;

a ladder-string applicator laterally spaced from said slot cutter assembly and comprising an entrance chamber for a slat and a ladder string having an opening thereof presented in alignment with the entrance chamber; and a conveyor situated between the slot cutter assembly and the entrance chamber of the ladder-string applicator for receiving a slat from the slot cutter assembly and advancing the slat toward said ladder-string applicator.

2. An assembly station as claimed in claim 1 further comprising at least one saw blade assembly cooperating with said slot cutter assembly having a saw blade for trimming an end of a slat.

3. An assembly station as claimed in claim 2 wherein the saw blade assembly additionally comprises a paint applicator applying paint to the end of the slat after trimming.

4. An assembly station as claimed in claim 1 wherein the slot cutter assembly has a clamp assembly comprising at least one clamp to hold a slat in place at said slot cutter assembly.

5. An assembly station as claimed in claim 1 having integral with the slot cutter assembly a slat support for receiving a slat for slot cutting therethrough.

6. An assembly station as claimed in claim 5 wherein the slat support comprises a retractable bridge situated such that when retracted a slat thereon drops therefrom to said first conveyor.

7. An assembly station as claimed in claim 1 having a slat retainer magazine for holding a vertical stack of slats and having a magazine pusher member situated to laterally advance one slat at a time from the stack to the slot cutter assembly.

8. An assembly station as claimed in claim 7 wherein the magazine pusher member, slat support, slot cutter assembly, saw blade assembly, conveyor and ladder-string applicator are each sequentially operative.

9. An assembly station as claimed in claim 8 comprising programmable coordinating controller programmed for continuous operation of the apparatus whereby an initial slat at a site is replaced by a succeeding slat substantially immediately after the initial slat is advanced to a succeeding site.

10. An assembly station module for slotting and stringedly assembling a plurality of window-blind slats for subsequent construction of a window-blind unit, the module comprising:

a magazine for maintaining a plurality of window blind slats in a vertical stack;

a plurality of slot cutter assemblies laterally spaced from said magazine, each comprising a cutter member for cutting a slot in a slat through which a pull cord can pass, and a slat support for receiving a slat for slot cutting therethrough;

two saw blade assemblies cooperatively operable with at least two of said slot cutter assemblies and each comprising a saw blade for trimming an end of a slat on said slat support;

a ladder-string applicator laterally spaced from said slot cutter assemblies and comprising an entrance chamber for a slat and a ladder string having an opening thereof presented in alignment with the entrance chamber;

a pusher member in communication with said magazine to laterally transport one slat at a time from said vertical stack to said slot cutter assemblies; and a conveyor positioned between the slot cutter assembly and the entrance chamber of the ladder-string applicator for receiving a slat from the slot cutter assembly and advancing the slat to ladder string applicator.

11. A modular assembly station as claimed in claim 10 wherein the saw blade assembly additionally comprises a paint applicator for sequentially applying paint to the end of the slat after trimming.

12. A modular assembly station as claimed in claim 10 wherein each slot cutter assembly has a clamp assembly comprising at least one clamp to hold a slat in place on the slat support when the cutter members of all cutter assemblies and the respective saw blades of the saw blade assemblies are in operation.

13. A modular assembly station as claimed in claim 12 wherein each slat support is a retractable bridge situated such that when retracted a slat thereon drops therefrom to the conveyor.

14. A modular assembly station as claimed in claim 10 wherein said conveyor comprises a platform situated beneath the slat support, and a channel situated between the platform and the ladder-string applicator to be substantially in alignment with the entrance chamber of the applicator, with said platform having a platform pusher member to advance a slat on the platform to the channel, and with said channel having a channel pusher member to advance a slat in the channel to the entrance chamber of the applicator.

15. A modular assembly station as claimed in claim 10 wherein the ladder-string applicator comprises a U-shape housing having near its top opposing inwardly projecting spring clips forming opposing ledges, and wherein the channel is movable upwardly to position a slat thereon upon the opposing ledges.

16. A modular assembly station as claimed in claim 15 wherein the magazine pusher member, slat support, slot cutter assembly, saw blade assembly, conveyor and ladder-string applicator each has at least one operator motor in communication with a coordinating controller.

17. A modular assembly station as claimed in claim 16 wherein the programmable coordinating controller is programmed for continuous operation of the apparatus whereby an initial slat at a site is replaced by a succeeding slat substantially immediately after the initial slat is advanced to a succeeding site.

18. A modular assembly station for slotting and stringedly assembling a plurality of window-blind slats for subsequent construction of a window-blind unit, the modular assembly station comprising:

a magazine for vertically stacking plural window blind slats;

at least one slot cutter assembly laterally spaced on a first side of said magazine comprising a fixture having a receiving slot in which a slat is releasably retainable in place;

a cutter member for cutting a slot in a slat through which a pull cord can pass;

a carrier positioned between said magazine and said slot cutter assembly for transporting one slat from said magazine to said receiving slot;

a ladder-string applicator laterally spaced on a second side of said magazine comprising an entrance chamber for a slat and a ladder string having an opening thereof presented in alignment with the entrance chamber; and a conveyor situated between the slot cutter assembly and the entrance chamber of the ladder-string applicator for receiving a slat from the slot cutter assembly and advancing the slat to the entrance chamber.

19. A modular assembly station as claimed in claim 18 having at least one saw blade assembly associated with said slot cutter assembly comprising a saw blade for trimming an end of a slat.

20. A modular assembly station as claimed in claim 19 wherein fixture, carrier and saw blade assembly operations are mechanically linked.

21. A modular assembly station as claimed in claim 18 wherein the slat is releasably retainable in place on said fixture by a roller.

22. A modular assembly station as claimed in claim 18 wherein a cutting punch blade is disposed in the fixture, said punch blade movable to cut the slot for the pull cord in a slat retained in the receiving slot of the fixture.

23. A modular assembly station as claimed in claim 22 wherein in a plurality of said fixtures the respective cutting punch blades are mechanically linked to operate simultaneously.

24. A modular assembly station as claimed in claim 18 wherein the carrier comprises two movable parallel support surfaces each having a step-down surface forming a notch for engaging a lower-most slat from a stack of slats.

25. An assembly station for slotting and stringedly assembling a plurality of window-blind slats for subsequent construction of a window-blind unit, the station comprising:

a plurality of slot cutter assemblies each movable longitudinally along the length of a window blind slat and each comprising a fixture having a receiving slot in which a slat is releasably retainable in place, a carrier capable of engaging and moving one slat laterally to said receiving slot, and a cutter member for cutting a slot in a slat through which a pull cord can pass;

two saw blade assemblies cooperatively operable with selected ones of the slot cutter assemblies and each comprising a saw blade for trimming an end of a slat;

a ladder-string applicator laterally positioned from said slot cutter assemblies comprising an entrance chamber for a slat and a ladder string having an opening thereof presented in alignment with the entrance chamber; and a conveyor situated between the slot cutter assembly and the entrance chamber of the ladder-string applicator for transporting a slat from the slot cutter assembly and advancing the slat to the entrance chamber.

26. An assembly station as claimed in claim 25 wherein the saw blade assembly additionally comprises a paint applicator and a paint dauber for sequentially applying paint to and removing excess paint from the lateral edge of the slat after trimming.

27. A modular assembly station as claimed in claim 25 wherein operation of the plurality of slot cutter assemblies are mechanically linked.

28. A modular assembly station as claimed in claim 25 wherein in each slot cutter assembly the slat is releasably retainable in place frictionally by a roller.

29. A modular assembly station as claimed in claim 25 wherein in each slot cutter assembly a cutting punch blade is disposed in the fixture, said punch blade movable to cut the slot for the pull cord in a slat retained in the receiving slot of the fixture.

30. A modular assembly station as claimed in claim 29 wherein the respective cutting punch blades are mechanically linked to operate simultaneously.

31. A modular assembly station as claimed in claim 25 wherein in each slot cutter assembly the carrier comprises two movable parallel support surfaces each having a step-down surface forming a notch for engaging a lower-most slat from a stack of slats.

* * * * *